(12) United States Patent
Teramoto et al.

(10) Patent No.: US 10,098,188 B2
(45) Date of Patent: Oct. 9, 2018

(54) INDUCTION HEATING COOKER

(71) Applicant: Panasonic Intellectual Property Management Co., Ltd., Osaka-shi, Osaka (JP)

(72) Inventors: Takahiro Teramoto, Hyogo (JP); Kohji Niiyama, Hyogo (JP); Kuniaki Sakakibara, Shiga (JP); Junichi Minatodani, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 494 days.

(21) Appl. No.: 14/771,388

(22) PCT Filed: Apr. 21, 2014

(86) PCT No.: PCT/JP2014/002235
§ 371 (c)(1),
(2) Date: Aug. 28, 2015

(87) PCT Pub. No.: WO2014/174828
PCT Pub. Date: Oct. 30, 2014

(65) Prior Publication Data
US 2016/0021708 A1 Jan. 21, 2016

(30) Foreign Application Priority Data

Apr. 25, 2013 (JP) ................. 2013-092335

(51) Int. Cl.
*H05B 6/06* (2006.01)
*H05B 6/12* (2006.01)

(52) U.S. Cl.
CPC ........... *H05B 6/1209* (2013.01); *H05B 6/062* (2013.01); *H05B 6/1272* (2013.01); *H05B 2213/05* (2013.01); *Y02B 40/126* (2013.01)

(58) Field of Classification Search
CPC .... H05B 6/1272; H05B 6/1209; H05B 6/062; H05B 2213/05; Y02B 40/126
(Continued)

(56) References Cited

U.S. PATENT DOCUMENTS

| 7,759,616 B2 * | 7/2010 | Gouardo ................ H05B 6/065 219/445.1 |
| 2009/0139986 A1 * | 6/2009 | Lee ....................... H05B 1/0266 219/622 |

(Continued)

FOREIGN PATENT DOCUMENTS

| CN | 101589646 A | 11/2009 |
| CN | 102047755 A | 5/2011 |

(Continued)

OTHER PUBLICATIONS

International Search Report in corresponding International Application No. PCT/JP2014/002235, dated Jun. 17, 2014, 2 pages.

(Continued)

*Primary Examiner* — Quang Van
(74) *Attorney, Agent, or Firm* — Brinks Gilson & Lione

(57) ABSTRACT

An induction heating cooker is provided that has a plurality of heating coils arranged under a top plate, that has power consumption, heat generation, and unnecessary radiation suppressed at the time of detection of a load, and that requires a short time for detection of a load. In the induction heating cooker of this disclosure, two or more heating coils are at the same time selected depending on a position of an area operated on the operation section. The operation detecting section performs the load detection only for the heating coils selected by an operation on the operation section. By using such a configuration, a user can select heating coils to be used out of a plurality of heating coils in advance. A load (Continued)

detection operation is not performed for heating coils other than the selected heating coils.

4 Claims, 2 Drawing Sheets

(58) Field of Classification Search
USPC ........ 219/622–627, 661, 663–665, 667, 671; 363/131, 95, 97
See application file for complete search history.

(56) References Cited

U.S. PATENT DOCUMENTS

| | | |
|---|---|---|
| 2009/0303201 A1 | 12/2009 | Isoda et al. |
| 2010/0243642 A1 | 9/2010 | Gouardo et al. |
| 2011/0011851 A1 | 1/2011 | Kataoka et al. |
| 2011/0168694 A1* | 7/2011 | Sadakata ............... H05B 6/062 219/624 |
| 2013/0056457 A1 | 3/2013 | Lee et al. |

FOREIGN PATENT DOCUMENTS

| | | |
|---|---|---|
| EP | 2 252 130 A1 | 11/2010 |
| EP | 2 395 813 A1 | 12/2011 |
| EP | 2 416 621 A1 | 2/2012 |
| EP | 2 579 680 A1 | 4/2013 |
| EP | 2 613 608 A1 | 7/2013 |
| JP | 63-49870 B2 | 8/1983 |
| JP | 63-49870 B2 | 10/1988 |
| JP | 2008-293871 A | 12/2008 |
| JP | 2010-108612 A | 5/2010 |
| WO | WO 2009/113235 A1 | 9/2009 |
| WO | WO 2009/119468 A1 | 10/2009 |
| WO | WO 2011/148568 A1 | 12/2011 |
| WO | WO 2012/029306 A1 | 3/2012 |

OTHER PUBLICATIONS

Extended Search Report in corresponding European Application No. 14788159.3, dated Apr. 18, 2016, 8 pages.
International Preliminary Report on Patentability and English language translation thereof, for corresponding International Application No. PCT/2014/002235 dated Nov. 5, 2015, 12 pages.
Office Action and English language translation of Search Report in corresponding Chinese Application No. 201480009398.3, dated May 17, 2017, 10 pages.

* cited by examiner

INDUCTION HEATING COOKER

This application is a 371 application of PCT/JP2014/002235 having an international filing date of Apr. 21, 2014, which claims priority to JP 2013-092335 filed Apr. 25, 2013, the entire contents of which are incorporated herein by reference.

TECHNICAL FIELD

This disclosure relates to an induction heating cooker inductively heating an object to be heated such as a metal cooking pot placed on a top plate.

BACKGROUND ART

An induction heating cooker typically used as an induction heating cooker has one or more heating coils for one heating port arranged directly under a top plate and is configured to inductively heat an object to be heated such as a metal cooking pot placed on the top plate with the heating coils.

Patent Document 1 presents an induction heating cooker in a multi-coil configuration having a plurality of heating coils arranged directly under a top plate to heat one object to be heated with a plurality of heating coils.

PRIOR ART DOCUMENT

Patent Document

Patent Document 1: JP2008-293871A

SUMMARY OF THE INVENTION

Problem to be Solved by the Invention

It is an object of this disclosure to provide an induction heating cooker that has a plurality of heating coils arranged under a top plate, that has power consumption, heat generation, and unnecessary radiation suppressed at the time of detection of an object to be heated (load), and that requires a short time for detection of the object to be heated (load).

Means for Solving Problem

For the purpose of solving the above problem, an induction heating cooker according to the present disclosure includes:
a body forming an outer contour;
a top plate disposed on an upper surface of the body for placing an object to be heated;
a plurality of heating coils arranged under the top plate to heat the object to be heated through induction heating;
an inverter circuit supplying a high-frequency current to the plurality of the heating coils;
a load detecting section detecting that an object to be heated is placed immediately above via the top plate for each of the plurality of the heating coils;
an operation section operated by a user, the operation section disposed with an individual area corresponding to each of the plurality of the heating coils;
a displaying section displaying a selection state of each of the plurality of the heating coils;
an operation detecting section outputting a detection signal of an operation to the individual areas of the operation section in accordance with an operation to the operation section; and
a control section controlling operations of the inverter circuit, the load detecting section, and the displaying section,
the operation detecting section outputting to the control section the detection signal indicative of selection of two or more heating coils out of the plurality of the heating coils in accordance with areas operated in the operation section,
the control section instructing the load detecting section to detect that an object to be heated is placed immediately above only for the selected heating coil indicated by the detection signal,
the control section instructing the displaying section to perform the display of the selection state of each of the plurality of the heating coils in the vicinity of the individual area of the operation section corresponding to the selected heating coil indicated by the detection signal.

By using such an induction heating cooker, a user can select a heating coil to be used out of a plurality of heating coils in advance and can provide control such that a load detection operation is not performed for the heating coils other than the selected heating coil.

Effect of the Invention

The induction heating cooker according to this disclosure limits heating coils to be used in advance if one object to be heated is heated by a plurality of heating coils, thereby suppressing power consumption, heat generation, and unnecessary radiation in the load detection and reducing a time required for the load detection.

DETAILED DESCRIPTION OF THE PREFERRED EMBODIMENTS

Figure 1:
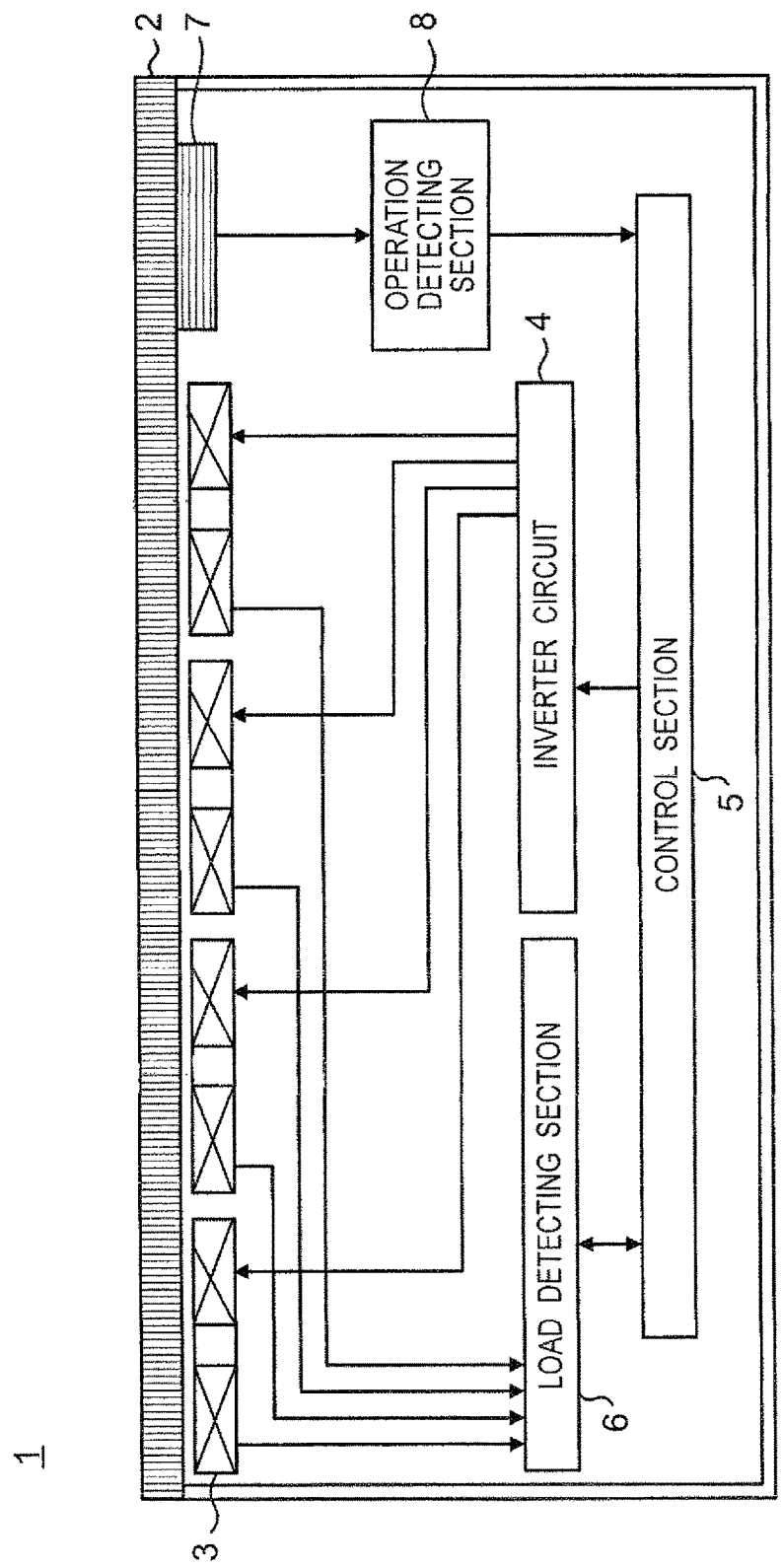
FIG. 1 is a block diagram of an induction heating cooker according to a first embodiment.

Circumstances Leading to Embodiment of the Present Invention

A conventional induction heating cooker disclosed in Patent Document 1 has a plurality of heating coils arranged closely to each other on an entire area under a top plate. This conventional induction heating cooker has a configuration in which an object to be heated can inductively be heated in accordance with a placed position regardless of a position where the object to be heated such as a cooking pot is placed on the top plate.

That is to say, the conventional induction heating cooker having a plurality of adjacently arranged heating coils instantaneously can detect a position at which a cooking pot is placed. A method of detecting the position of the cooking pot is disclosed as a method of applying a current to each of the heating coils at a frequency higher than a frequency, of a normally applied current so as to determine whether a load (a cooking pot) is placed, based on a current value applied to the heating coils in this situation.

Consideration will be given to specific application of the above method to an induction heating cooker having a plurality of adjacently arranged heating coils. Since a multiplicity of heating coils is arranged in this case, if an operation according to the above method is performed for individual heating coils at the same time, this leads to a problem that a large amount of electric power is consumed simply by a cooking pot detection operation. To enable the detection operation for a plurality of heating coils at the same time, a circuit is required to apply a high-frequency current to a plurality of the heating coils at the same time, resulting in an increase in overall size of the induction heating cooker. Moreover, the induction heating cooker must always perform the cooking pot detection operation, resulting in a problem of increased heat generation from an inverter corresponding to a heating coil without an object to be heated placed thereon and a problem of unnecessary radiation noise generated by the detection operation.

A method of sequentially switching the heating coils subjected to the application of the high-frequency current is also disclosed. This method can make the number of inverters smaller than the number of heating coils. However, the connection between an inverter and heating coils is switched a very large number of times, resulting in a problem that the durability of a switching circuit including a relay etc., tends to be insufficient. If a high-frequency current is sequentially and regularly applied to each of the heating coils, this results in a problem that a time required for detection after placement of a load (a cooking pot) is made longer as the number of the heating coils increases.

The induction heating cooker of this disclosure solves the conventional problems. The induction heating cooker of this disclosure suppresses power consumption, heat generation, and unnecessary radiation at the time of detection of a load (e.g., a cooking pot) and also reduces a time required for detecting an object to be heated in a configuration having a plurality of heating coils arranged under a top plate.

A first invention in accordance with this disclosure is an induction heating cooker including:

a body forming an outer contour;

a top plate disposed on an upper surface of the body for placing an object to be heated;

a plurality of heating coils arranged under the top plate to heat the object to be heated through induction heating;

an inverter circuit supplying a high-frequency current to the plurality of the heating coils;

a load detecting section detecting that an object to be heated is placed immediately above via the top plate for each of the plurality of the heating coils;

an operation section operated by a user, the operation section disposed with an individual area corresponding to each of the plurality of the heating coils;

a displaying section displaying a selection state of each of the plurality of the heating coils;

an operation detecting section outputting a detection signal of an operation to the individual areas of the operation section in accordance with an operation to the operation section; and a control section controlling operations of the inverter circuit, the load detecting section, and the displaying section.

The operation detecting section outputs to the control section the detection signal indicative of selection of two or more heating coils out of the plurality of the heating coils in accordance with areas operated in the operation section.

The control section instructs the load detecting section to detect that an object to be heated is placed immediately above only for the selected heating coil indicated by the detection signal.

The control section instructs the displaying section to perform the display of the selection state of each of the plurality of the heating coils in the vicinity of the individual area of the operation section corresponding to the selected heating coil indicated by the detection signal.

As a result, since the load detection is performed only for the heating coils selected by a user, the induction heating cooker according to the first aspect of invention may not perform the load detection for the heating coils not expected to perform heating and therefore can suppress the power consumption, the heat generation of the inverters and the heating coils, and the unnecessary radiation and reduce the time required for the load detection. Since the displaying section performs the display in the vicinity of the operation section in accordance with each of the plurality of the heating coils, this allows the user to easily match an image related to a range of the heating coils actually caused to perform heating with an image related to an operation range in the operation section. Moreover, the user can intuitively comprehend a position to be selected for heating and can select a heating coil with a simple operation.

A second invention in accordance with this disclosure is an induction heating cooker including:

a body forming an outer contour;

a top plate disposed on an upper surface of the body for placing an object to be heated;

a plurality of heating coils arranged under the top plate to heat the object to be heated through induction heating;

an inverter circuit supplying a high-frequency current to the plurality of the heating coils;

a load detecting section detecting that an object to be heated is placed immediately above via the top plate for each of the plurality of the heating coils;

an operation section operated by a user, the operation section disposed with an individual area corresponding to each of the plurality of the heating coils;

a displaying section displaying a selection state of each of the plurality of the heating coils;

an operation detecting section made up of at least two or more electrodes, the operation detecting section outputting a detection signal of an operation related to the individual areas of the operation section continuously in accordance with a movement locus on the operation section touched by a finger of the user; and a control section controlling operations of the inverter circuit, the load detecting section, and the displaying section.

The operation detecting section outputs to the control section the detection signal indicative of selection of two or more heating coils out of the plurality of the heating coils in accordance with continuous areas on the movement locus operated in the operation section.

The control section instructs the load detecting section to detect that an object to be heated is placed immediately above only for the selected heating coils indicated by the detection signal.

The control section instructs the displaying section to perform the display of the selection state of each of the plurality of the heating coils in the vicinity of the individual areas of the operation section corresponding to the selected heating coils indicated by the detection signal.

As a result, since the load detection is performed only for the heating coils selected by a user, the induction heating cooker according to the second aspect of invention may not perform the load detection for the heating coils not expected to perform heating and therefore can suppress the power consumption, the heat generation of the inverters and the heating coils, and the unnecessary radiation and reduce the time required for the load detection. Since the displaying section performs the display in the vicinity of the operation section in accordance with each of the plurality of the heating coils, this allows the user to easily match an image related to a range of the heating coils actually caused to perform heating with an image related to an operation range in the operation section. Moreover, when selecting a plurality of heating coils, the user can easily make a selection simply by tracing the operation section corresponding to the heating coils desired to actually perform heating.

A third invention in accordance with this disclosure is an induction heating cooker wherein, especially in the first or the second invention, the control section provides control to turn off, or to reduce brightness of, the display in the vicinity of the individual area of the operation section corresponding to a heating coil determined as having no object to be heated immediately thereabove by the load detecting section out of the selected heating coils indicted by the detection signal, and wherein the control section provides control to stop supply of electric power to the heating coil determined as having no object to be heated immediately thereabove by the load detecting section.

By using the induction heating cooker according to the third aspect of invention, a user may not need to accurately comprehend a size of an object to be heated in advance when selecting a heating coil expected to be used, and may select the heating coils in a range somewhat larger than the object to be heated. Therefore, the range of the heating coils can be selected with a simple operation, and the induction heating cooker can suppress the power consumption, the heat generation of the inverters and the heating coils, and the unnecessary radiation and reduce the time required for the load detection.

Embodiments will now be described in detail with reference to the drawings as needed. It is noted that detailed description will not be provided more than necessary in some cases. For example, detailed description of already well-known facts and repeated description of substantially the same constituent elements may not be provided. This is for the purpose of avoiding unnecessary redundancy of the following description and facilitating understanding by those skilled in the art.

The inventor(s) provides the accompanying drawings and the following description for sufficient understanding of this disclosure by those skilled in the art and it is not intended to limit the subject matter described in the claims thereto.

First Embodiment

Figure 2:
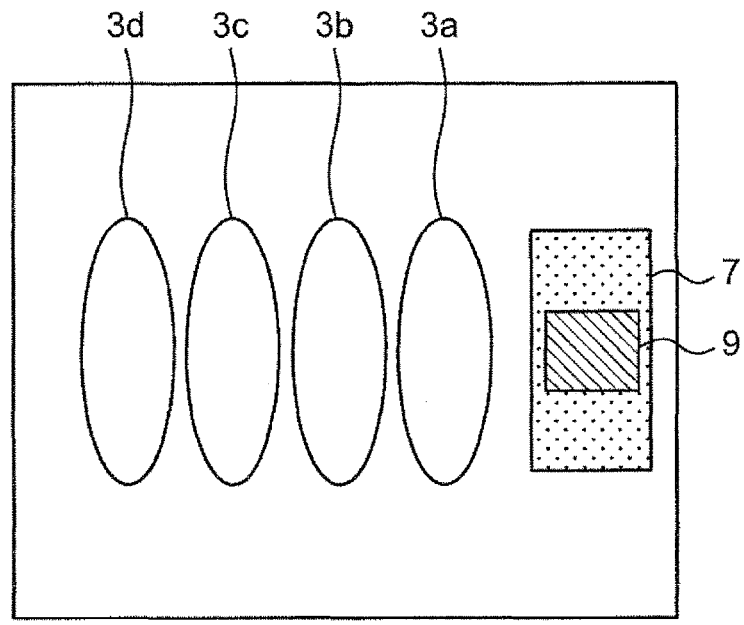
FIG. 2 is a top view of the induction heating cooker according to the first embodiment, depicting a state of arrangement of heating coils and an operation section in the induction heating cooker (with a top plate removed).
Figure 3:
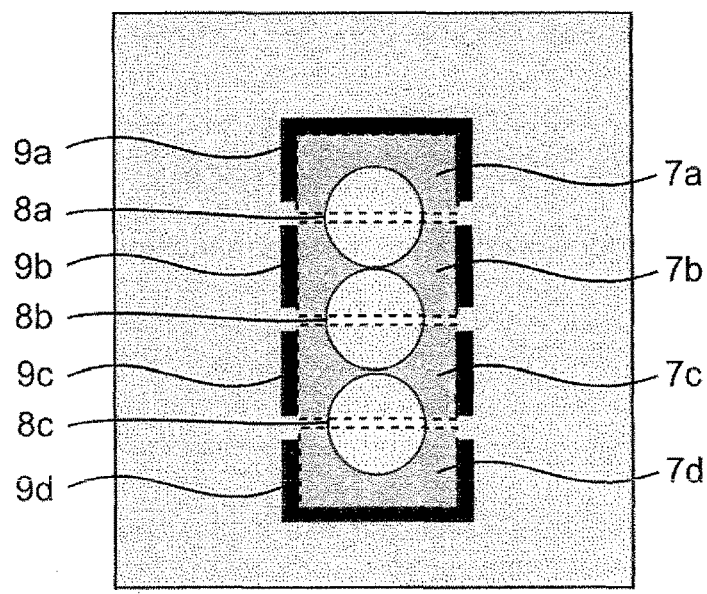
FIG. 3 is a diagram of a configuration of the operation section according to the first embodiment.

FIG. 1 is a block diagram of an induction heating cooker according to a first embodiment. FIG. 2 is a top view of the induction heating cooker according to the first embodiment, depicting a state of arrangement of heating coils 3 and an operation section 7 in the induction heating cooker (with a top plate 2 removed). FIG. 3 is a diagram of a configuration of the operation section 7 according to the first embodiment.

1. Configuration of Induction Heating Cooker

In the induction heating cooker depicted in FIG. 1, the top plate 2 for placing an object to be heated is disposed on an upper surface of a body 1 forming an outer contour. Although the top plate 2 is often made of crystallized glass, this is not a limitation.

A plurality of the heating coils 3 lined up longitudinally (in the horizontal direction in the drawing) is arranged under the top plate 2. The induction heating cooker depicted in FIG. 1 is disposed with four heating coils. In particular, the four heating coils are made up of a first heating coil 3a, a second heating coil 3b, a third heating coil 3c, and a fourth heating coil 3d. A plurality of the heating coils (the four heating coils in this embodiment) under the top plate 2 forms one stove (the same applies to the following). By arranging a plurality of the heating coils 3, one object to be heated can be placed across a plurality of the heating coils 3. Each of the heating coils 3 (i.e., the first heating coil 3a, the second heating coil 3b, the third heating coil 3c, and the fourth heating coil 3d) generates a magnetic flux from a high-frequency current supplied from an inverter circuit 4 in accordance with an instruction of a control section 5 to inductively heat an object to be heated placed on the top plate 2.

Although the heating coils 3 are arranged vertically in four rows and horizontally in one line in the embodiment, this arrangement is not a limitation as long as two or more heating coils are arranged.

The control section 5 is connected to the inverter circuit 4, a load detecting section 6, and an operation detecting section 8. The control section 5 is connected via the operation detecting section 8 or directly to the operation section 7 for allowing a user of the induction heating cooker to give an instruction for a heating power etc., and supplies electric power to the inverter circuit 4 in accordance with the heating instruction from the user. The control section 5 controls the power supplied by the stove to achieve a (so-called) fire power intended by the user.

The load detecting section 6 determines whether an object to be heated (e.g., a cooking pot) is present immediately above each of the heating coils 3. The control section 5 receives the determination result and operates the heating coils 3 via the inverter circuit 4 such that only the heating coils 3 having the object to be heated present immediately thereabove performs a heating operation.

The load detecting section 6 may detect a change in electrostatic capacity due to the presence/absence of an object to be heated (a cooking pot) by an electrode disposed on an upper surface or a lower surface of the top plate 2. The load detecting section 6 may detect a change in inductance of a coils for detection disposed separately so as to detect the presence/absence of a load (the object to be heated). The load detecting section 6 may detect the presence/absence of a load (the object to be heated) based on a response of the inverter circuit 4 when a high-frequency current is applied to the heating coils 3.

Although the control section 5 is often constructed as a microcomputer, a DSP, and/or a custom IC, this is not a limitation. The control section 5 and the load detecting section 6 may form one element.

The operation section 7 is connected to the operation detecting section 8. As depicted in FIGS. 2 and 3, areas of a first operation section 7a, a second operation section 7b, a third operation section 7c, and a fourth operation section 7d are disposed correspondingly to the first heating coil 3a, the second heating coil 3b, the third heating coil 3c, and the fourth heating coil 3d and independently of each other in the operation section 7 on the top plate 2. This allows a user of the induction heating cooker to easily match an image related to a range of the heating coils 3 actually caused to perform heating with an image related to an operation range (area) in the operation section 7.

As depicted in FIG. 3, a displaying section 9 is disposed correspondingly to the first heating coil 3a, the second heating coil 3b, the third heating coil 3c, and the fourth heating coil 3d. In particular, a first displaying section 9a, a second displaying section 9b, a third displaying section 9c, and a fourth displaying section 9d are disposed independently of each other to surround the peripheries of the first operation section 7a, the second operation section 7b, the third operation section 7c, and the fourth operation section 7d. The displaying section 9 is made up of the first displaying section 9a, the second displaying section 9b, the third displaying section 9c, and the fourth displaying section 9d. Although the displaying section 9 is disposed to surround the periphery of the operation section 7 in this embodiment, this is not a limitation as long as the displaying section can indicates the areas corresponding to the heating coils.

The operation detecting section 8 is located under the operation section 7 and is connected to the operation section 7. The operation detecting section 8 detects an operation of the operation section 7 by a user. In this embodiment, the operation detecting section 8 is made up of a first operation detecting section 8a, a second operation detecting section 8b, and a third operation detecting section 8c. In this embodiment, the first operation detecting section 8a, the second operation detecting section 8b, and the third operation detecting section 8c are made up of three conductive springs at positions depicted in FIG. 3. Although the operation detecting section 8 is made up of the three conductive springs in this embodiment, the operation detecting section 8 may be made up of at least two or more electrodes of conductive metal or rubber etc., as long as a place (position) operated by a finger can be identified.

2. Operations of the Operation Section, the Operation Detecting Section, and the Control Section 2.1. Heating Coil Selection Operation by the Operation Section The selection of the object heating coils 3 by the operation section 7 will be described. In this embodiment, the three operation detecting section 8, i.e., the first to third operation detecting section 8a to 8c are disposed for the four operation sections 7 made up of the first to fourth operation sections 7a to 7d. A position operated on the operation section 7 is identified depending on strength of response of each electrode of the three operation detecting section 8 (the first to third operation detecting section 8a to 8c).

In this embodiment, the first to fourth operation sections 7a to 7d are configured such that an operation to each independent operation section and an operation between two adjacent operation sections may be accepted. A pressed position may be identified from a ratio of strength of response of each electrode in the three operation detecting section 8. This position detection mechanism in the operation detecting section 8 is not a limitation as long as the position operated on the operation section 7 may be identified depending on the strength of pressing the operation section 7 (and the operation detecting section 8).

The induction heating cooker of this embodiment is configured such that when the user of the induction heating cooker performs an operation between the first operation section 7a and the second operation section 7b, the heating coils 3 may be used in the range of the corresponding first and second heating coils 3a and 3b through the detection operation of the corresponding operation detecting section 8 and the control operation of the control section 5 receiving a detection signal from the detection operation. When the user of the induction heating cooker performs an operation between the third operation section 7c and the fourth operation section 7d, the heating coils 3 may be used in the range of the corresponding third and fourth heating coils 3c and 3d through the detection operation of the corresponding operation detecting section 8 and the control operation of the control section 5 receiving a detection signal from the detection operation.

When the user of the induction heating cooker performs an operation between the second operation section 7b and the third operation section 7c, the heating coils 3 may be used in the range of all the heating coils 3.

As described above, the operation section 7, the operation detecting section 8, and the control section 5 are configured in this embodiment such that the operation section 7 enables the selection of the two heating coils 3 (the third heating coil 3c and the fourth heating coil 3d) on the upper side (the far side of the body), the two heating coils 3 (the first heating coil 3a and the second heating coil 3b) on the lower side (the near side of the body), or all the heating coils 3a. It is preferable that the heating coils be selected to increase the convenience for a user and the selection patterns may not be limited to those described above.

2.2. Operations of the Load Detecting Section and the Control Section

When an operation is performed between the first operation section 7a and the second operation section 7b, the operation detecting section 8 determines that both the first operation section 7a and the second operation section 7b are selected. The control section 5 receives the detection signal from the operation detecting section 8 and gives an instruction for causing both the corresponding first and second displaying section 9a and 9b to emit light.

Additionally, the load detecting section 6 determines whether an object to be heated is present immediately above each of the selected first and second heating coils 3a and 3b. If the load detecting section 6 determines that an object to be heated is present immediately above both the first heating coil 3a and the second heating coil 3b, the control section 5 receiving the determination signal provides control so as to supply electric power through the inverter circuit 4 to the first heating coil 3a and the second heating coil 3b. The induction heating cooker performs cooking without change. On the other hand, if the load detecting section 6 determines that the object to be heated is present immediately above only either the first heating coil 3a or the second heating coil 3b without an object to be heated immediately above the other heating coil, the control section 5 receiving the determination signal provides control so as to stop the supply of electric power to the heating coil 3 determined as having no object to be heated immediately thereabove and to turn off the corresponding one of the displaying section 9.

As described above, when the load detecting section 6 determines that no object to be heated is present immediately above one of the heating coils 3 in this embodiment, the control section 5 turns off the displaying section 9 corresponding to the heating coil 3. This is not a limitation as long as whether the heating coils are being stopped or performing heating can be determined and, for example, the control section 5 may blink the displaying section 9 corresponding to the heating coil 3 or may switch the displaying section 9 to a dim light.

When the load detecting section 6 determines that no object to be heated is present immediately above all the selected heating coils 3, the control section 5 receiving the determination signal blinks all the displaying section 9 corresponding to the selected heating coils 3 for several seconds before causing a shift to an initial state.

When an operation is performed between the third operation section 7c and the fourth operation section 7d, the operation detecting section 8 determines that both the third operation section 7c and the fourth operation section 7d are selected as is the case with the operation described above. The control section 5 receives the detection signal from the operation detecting section 8 and gives an instruction for causing both the corresponding third and fourth displaying section 9c and 9d to emit light.

Additionally, the load detecting section 6 determines whether an object to be heated is present immediately above each of the selected third and fourth heating coils 3c and 3d. If the load detecting section 6 determines that an object to be heated is present immediately above both the third heating coil 3c and the fourth heating coil 3d, the control section 5 receiving the determination signal provides control so as to supply electric power through the inverter circuit 4 to the third heating coil 3c and the fourth heating coil 3d. The induction heating cooker performs cooking without change. On the other hand, if the load detecting section 6 determines that an object to be heated is present immediately above only either the third heating coil 3c or the fourth heating coil 3d without an object to be heated immediately above the other heating coil, the control section 5 receiving the determination signal provides control so as to stop the supply of electric power to the heating coil 3 determined as having no object to be heated immediately thereabove and to turn off the corresponding one of the displaying section 9.

When the load detecting section 6 determines that no object to be heated is present immediately above all the selected heating coils 3, the control section 5 receiving the determination signal blinks all the displaying section 9 corresponding to the selected heating coils 3 for several seconds before causing a shift to an initial state.

When an operation is performed between the second operation section 7b and the third operation section 7c, the operation detecting section 8 determines that all the first to fourth operation sections 7a to 7d are selected. The control section 5 receives the detection signal from the operation detecting section 8 and gives an instruction for causing all the first to fourth displaying section 9a to 9d to emit light.

Additionally, the load detecting section 6 determines whether an object to be heated is present immediately above each of the selected first to fourth heating coils 3a to 3d. If the load detecting section 6 determines that an object to be heated is present immediately above all the first to fourth heating coils 3a to 3d, the control section 5 receiving the determination signal provides control so as to supply electric power through the inverter circuit 4 to all the heating coils 3. The induction heating cooker performs cooking without change. On the other hand, if the load detecting section 6 determines that an object to be heated is present only immediately above some of the first to fourth heating coils 3a to 3d without an object to be heated immediately above the other heating coil(s) 3, the control section 5 receiving the determination signal provides control so as to stop the supply of electric power to the heating coil(s) 3 determined as having no object to be heated immediately thereabove and to turn off the corresponding displaying section 9 or to reduce the brightness of the corresponding displaying section 9.

When the load detecting section 6 determines that no object to be heated is present immediately above all the selected heating coils 3, the control section 5 receiving the determination signal blinks the first to fourth displaying section 9a to 9d for several seconds before causing a shift to an initial state. However, for example, if the multiple heating coils 3 having an object to be heated immediately thereabove are away from each other such as when an object to be heated is present only immediately above the first heating coils 3a and the fourth heating coil 3d, and no object to be heated is present immediately above the heating coils 3 therebetween, this is considered as an situation in which the induction heating cooker is used with an intention different from proper usage and, therefore, the displaying section 9 performs error display in accordance with an instruction from the control section 5.

3. Another Form of the Operation Section

In the induction heating cooker according to this embodiment, the heating coils to be used is selected depending on a position of an area touched and operated by a finger on the operation section 7. In this case, if the induction heating cooker employs a configuration in which the operation detecting section 8 detecting an operation to the operation section 7 outputs a detection signal corresponding to a movement locus of the finger on the operation section 7 so that the control section 5 selects the heating coils to be used based on this detection signal, the operability is further improved.

Specifically, for example, when a user first touches the second operation section 7b with a finger, then moves the finger to the first operation section 7a in a sliding manner without separating the finger, and separates the finger, the first operation section 7a and the second operation section 7b corresponding to the movement (operation) locus of the finger are selected. For example, when the user first touches the third operation section 7c with a finger, then moves the finger to the first operation section 7a in a sliding manner without separating the finger, and separates the finger, the three operation sections 7 from the first operation section 7a to the third operation section 7c corresponding to the movement (operation) locus of the finger are selected.

After the operation sections 7 are selected, as in the operation described above, the displaying section 9 corresponding to the selected operation sections 7 are lit and the load detection is started immediately above the corresponding heating coils 3. This enables user to freely select a plurality of the continuously arranged operation sections 7. For example, the user can intuitively freely perform a selection operation to the operation sections 7 (and the heating coils 3) without learning an operation rule such as "when an operation is performed between the multiple operation sections 7, the both operation sections 7 are selected."

The induction heating cooker according to this embodiment is assumed to have the operation sections 7 of, for example, an electrostatic touch type operated by contact of a finger. If a selection method using a contact position of a finger for determining a heating coil to be used is employed without employing the selection method using a movement locus of a finger, requisite and sufficient effects are acquired from the operation sections made up of, for example, tactile switches that are switches pushed down for input, instead of the operation sections of the electrostatic touch type.

4. Other Forms of the Inverter Circuit and the Control Section

In the induction heating cooker according to this embodiment, the control section 5 and the inverter circuit 4 stop the supply of electric power to the heating coil 3 determined as having no object to be heated immediately thereabove out of the selected heating coils 3.

The control section 5 may stop the supply of electric power only after a predetermined time has elapsed from the time point when the load detecting section 6 determines that no object to be heated is present immediately above. Additionally, the control section 5 may blink the displaying section 9 corresponding to the heating coil 3 determined as having no object to be heated immediately thereabove, before stopping the supply of electric power in this way. As a result, a user may be notified of a mismatch between the position of the object to be heated and the position of the selected heating coil 3. If the position of placement of the object to be heated is incorrect, this notification gives the user a grace period for correcting the position of placement of the object to be heated.

If the heating coils are selected in a range larger than the size of the object to be heated, the supply of electric power is automatically stopped by leaving the heating coil 3 determined as having no object to be heated immediately thereabove as it is.

In the induction heating cooker according to this embodiment, a predetermined waiting time may be provided after the operation section 7 corresponding to the heating coil 3 expected to be used is selected, until heating is actually started. Alternatively, a heating start operation section may separately be disposed to start the heating after the heating start operation section is operated.

As a result, even if a user operates the operation sections 7 to operate (select) the operation sections 7 corresponding to the heating coils 3 expected to be used and a selection state different from the intention of the user is achieved due to an operation error or an insufficient or excessive distance of the movement locus of the operation, the user can perform the selection operation again during the time before the start of heating. Therefore, the induction heating cooker according to this embodiment includes an easy-to-handle operation system giving a sense of security to the user.

5. Conclusion

As described above, the induction heating cooker according to this embodiment performs an operation of detecting an object to be heated only for a heating coil expected to be used selected by a user in advance. Therefore, the induction heating cooker according to this embodiment does not perform the operation of detecting an object to be heated for an unselected heating coil not expected to perform heating.

Therefore, the induction heating cooker according to this embodiment can reduce the power consumption, the heat generation of inverters and the heating coils, and the unnecessary radiation and shorten the time required for the load detection. The induction heating cooker allows a user to easily match an image related to a range of the heating coil(s) 3 actually caused to perform heating with an image related to an operation range in the operation section 7 and the displaying section 9. Therefore, the user can intuitively comprehend a position (place) selected for heating.

When the user selects a plurality of heating coils, the induction heating cooker according to this embodiment enables the user to easily make a selection simply by tracing the display positions of the heating coils desired to actually perform heating. Therefore, the induction heating cooker according to this embodiment has high operability.

When the user selects the heating coils expected to be used in the induction heating cooker according to this embodiment, the user may not need to accurately comprehend the size of the object to be heated in advance. In other words, the user may select the heating coils in a somewhat larger range. The induction heating cooker according to this embodiment can automatically exclude (i.e., stop) the heating coil that does not heat an object to be heated, i.e., that is determined as having no object to be heated immediately thereabove, out of the heating coils within the selected range. The induction heating cooker according to this embodiment enables a user to select the heating range with a simple operation and can suppress the power consumption, the heat generation of the inverters and the heating coils, and the unnecessary radiation and reduce the time required for the load detection.

INDUSTRIAL APPLICABILITY

The induction heating cooker according to this disclosure can suppress power consumption, heat generation, and unnecessary radiation at the time of load detection by selecting a heating coil expected to be used in advance and, therefore, the concept according to this disclosure is applicable to an induction heating device heating one object to be heated with a plurality of heating coils.

What is claimed is:

1. An induction heating cooker comprising:
a body forming an outer contour;
a top plate disposed on an upper surface of the body for placing an object to be heated;
a plurality of heating coils arranged under the top plate to heat the object through induction heating;
an inverter circuit which supplies a high-frequency current to the plurality of heating coils;
a load detecting section which detects the heating of the object which is placed above the plurality of heating coils via the top plate;
an operation section for receiving user's selection input, wherein the operation section is disposed with respective individual areas each corresponds to each of the plurality of the heating coils;
a displaying section disposed within the operation section which displays a selection state of each of the plurality of heating coils;
an operation detecting section which outputs a detection signal according to the received user's selection input to the individual areas of the operation section; and
a control section which controls operations of the inverter circuit, the load detecting section, and the displaying section,
wherein based on received user's selection input to the display section when selecting two or more continuous respective individual areas within the operation section, the operation detecting section outputs to the control section, detection signals indicative of a selection to operate two or more respective heating coils, corresponding to the two or more continuous respective individual areas,
wherein the control section instructs the load detecting section to detect that the object to be heated is placed only above the selected two or more respective heating coils as indicated by the detection signals, and
the control section instructs the displaying section to display the selection state of each of the plurality of heating coils in a vicinity of the respective individual areas of the operation section corresponding to the selected two or more respective heating coils as indicated by the detection signals.

2. An induction heating cooker comprising:
a body forming an outer contour;
a top plate disposed on an upper surface of the body for placing an object to be heated;
a plurality of heating coils arranged under the top plate to heat the object through induction heating;
an inverter circuit which supplies a high-frequency current to the plurality of heating coils;
a load detecting section which detects the heating of the object which is placed above the plurality of heating coils via the top plate;

an operation section for receiving user's selection input, wherein the operation section is disposed with respective individual areas each corresponds to each of the plurality of the heating coils;

a displaying section disposed within the operation section which displays a selection state of each of the plurality of heating coils;

an operation detecting section made up of at least two or more electrodes, the operation detecting section which outputs a detection signal according to the received user's selection input with a movement locus on the operation section touched by a finger of the user; and a control section which controls operations of the inverter circuit, the load detecting section, and the displaying section, wherein the operation detecting section outputs to the control section, detection signals indicative of a selection to operate two or more respective heating coils corresponding to the two or more continuous respective individual areas in accordance to the movement locus operated in the operation section, wherein the control section instructs the load detecting section to detect that the object to be heated is placed only above the selected two or more respective heating coils as indicated by the detection signals, and the control section instructs the displaying section to display the selection state of each of the plurality of heating coils in a vicinity of the respective individual areas of the operation section corresponding to the selected two or more respective heating coils as indicated by the detection signals.

3. The induction heating cooker of claim 1, wherein the control section provides control to turn off, or to reduce brightness of, the display in the vicinity of the individual area of the operation section corresponding to a heating coil determined as having no object to be heated immediately thereabove by the load detecting section out of the selected heating coils indicted by the detection signal, and wherein the control section provides control to stop supply of electric power to the heating coil determined as having no object to be heated immediately thereabove by the load detecting section.

4. The induction heating cooker of claim 2, wherein the control section provides control to turn off, or to reduce brightness of, the display in the vicinity of the individual area of the operation section corresponding to a heating coil determined as having no object to be heated immediately thereabove by the load detecting section out of the selected heating coils indicted by the detection signal, and wherein the control section provides control to stop supply of electric power to the heating coil determined as having no object to be heated immediately thereabove by the load detecting section.

* * * * *